US009859993B2

(12) United States Patent
Amizur et al.

(10) Patent No.: US 9,859,993 B2
(45) Date of Patent: Jan. 2, 2018

(54) APPARATUS, SYSTEM AND METHOD OF COMMUNICATING FILTER INFORMATION (71) Applicant: Intel Corporation, Santa Clara, CA (US)

(72) Inventors: Yuval Amizur, Kfar Saba (IL); Uri Schatzberg, Kiryat Ono (IL); Leor Banin, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 578 days.

(21) Appl. No.: 13/681,561

(22) Filed: Nov. 20, 2012

(65) Prior Publication Data
US 2014/0094207 A1 Apr. 3, 2014

Related U.S. Application Data (60) Provisional application No. 61/707,961, filed on Sep. 30, 2012.

(51) Int. Cl.
*H04B 7/00* (2006.01)
*H04B 17/00* (2015.01)
(Continued)

(52) U.S. Cl.
CPC ............. *H04B 17/00* (2013.01); *G01S 5/021* (2013.01); *G01S 5/0226* (2013.01);
(Continued)

(58) Field of Classification Search
CPC .......... H04B 17/00; H04B 17/14; H04B 7/24; H04W 72/044; G01S 11/02; G01S 5/021; G01S 5/0226; G01S 5/0236; G01S 5/14
(Continued)

(56) References Cited

U.S. PATENT DOCUMENTS 7,880,672 B1 * 2/2011 Doerry .......................... 342/201
2002/0193085 A1 * 12/2002 Mathe .................. H03F 1/0222
455/126

(Continued)

FOREIGN PATENT DOCUMENTS

| CN | 102170294 | 8/2011 |
| JP | 2009161076 | 7/2009 |
| KR | 20110094671 | 8/2011 |

OTHER PUBLICATIONS

International Search Report and Written Opinion for PCT Patent Application No. PCT/US2013/048068, dated Oct. 18, 2013, 12 pages.

(Continued)

*Primary Examiner* — Xin Jia
(74) *Attorney, Agent, or Firm* — Shichrur & Co.

(57) ABSTRACT

Some demonstrative embodiments include devices, systems and/or methods of communicating filter information. For example, a device may include a wireless communication unit to perform the functionality of a first station (STA) to communicate with a second STA, the wireless communication unit is to communicate filter information including Transmit (Tx) filter information, the Tx filter information representing one or more Tx filter parameters of one or more Tx filters utilized by at least one STA selected from the group consisting of the first STA and the second STA.

29 Claims, 5 Drawing Sheets (51) Int. Cl.
    *H04B 7/24*     (2006.01)
    *H04W 72/04*     (2009.01)
    *H04B 17/14*     (2015.01)
    *G01S 5/02*     (2010.01)
    *G01S 5/14*     (2006.01)
    *G01S 11/02*     (2010.01)

(52) U.S. Cl.
    CPC .............. *G01S 5/0236* (2013.01); *G01S 5/14* (2013.01); *H04B 7/24* (2013.01); *H04B 17/14* (2015.01); *H04W 72/044* (2013.01); *G01S 11/02* (2013.01)

(58) Field of Classification Search
    USPC .................................. 455/509, 456.3, 62, 70
    See application file for complete search history.

(56) References Cited

U.S. PATENT DOCUMENTS

| | | | |
|---|---|---|---|
| 2007/0072621 A1* | 3/2007 | Mukkavilli | G01S 5/021 455/456.1 |
| 2007/0086543 A1* | 4/2007 | David | H04B 7/0452 375/299 |
| 2008/0117870 A1 | 5/2008 | Hurtta | |
| 2011/0170463 A1* | 7/2011 | Aryan | G01S 13/74 370/281 |
| 2012/0032855 A1* | 2/2012 | Reede et al. | 342/458 |
| 2012/0147971 A1* | 6/2012 | Chien et al. | 375/240.23 |
| 2012/0163261 A1* | 6/2012 | Vedantham et al. | 370/311 |
| 2012/0243433 A1* | 9/2012 | Kneckt et al. | 370/252 |

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.
IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks—Specific requirements, Mar. 29, 2012.
Wi-Fi Alliance Technical Committee P2P Task Group. Wi-Fi Peer-to-Peer (P2P) Technical Specification. Version 1.2; 160 pages; Dec. 14, 2011.
International Preliminary Report on Patentability and Written Opinion for International Application No. PCT/US2013/048068, dated Apr. 9, 2015, 8 pages.
Search Report for European Patent Application No. 13843008.7 dated Mar. 23, 2016, 9 pages.
Freescale Semiconductor Inc: "Results on Zero-forcing beamforming Multi-user MIMO scheme" 3GPP Draft; R1-071205_Updated1054 FSL MU_MIMO_ 3rd Generation Partnership Project (3GPP), Mobile Competence Centre; 650, Route Des Lucioles; F-06921 Sophia-Anti Cedex; France, vol. RAN WG1, no. St. Louis, USA; Feb. 18, 2007, Feb. 18, 2007, 7 pages.
Office Action for Chinese Patent Application No. 201380045122.6, dated Jan. 26, 2017, 10 pages.
Office Action for Chinese Patent Application No. 201380045122.6, dated Sep. 29, 2017, 9 pages.
English translation, received on Nov. 17, 2017, of the Sep. 29, 2017 Office Action for Chinese Patent Application No. 201380045122.6, 13 pages.

* cited by examiner

APPARATUS, SYSTEM AND METHOD OF COMMUNICATING FILTER INFORMATION

CROSS REFERENCE

This application claims the benefit of and priority from U.S. Provisional Patent application No. 61/707,961, entitled "Apparatus, system and method of communicating filter information", filed Sep. 30, 2012, the entire disclosure of which is incorporated herein by reference.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

One solution for indoor navigation includes a Time-of-Flight (ToF) measurement method. The ToF may be defined as the overall time a signal propagates from a first station, e.g., a user ("client") mobile device, to a second station, e.g., an access point (AP), and back to the first station. A distance between the first and second stations may be calculated based on the ToF value, for example, by dividing the ToF value by two and multiplying the result by the speed of light.

The first station may determine a relative location of the first station with respect to the second station based on the calculated distance.

An estimated location of the first station may be determined by calculating two or more distances between the first station and two or more other stations, e.g., other APs, by utilizing a suitable method, e.g., a trilateration method.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.0, *April* 2010, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2102*; *IEEE*802.11 task group ac (TGac) (*"IEEE*802.11-09/0308r12—*TGac Channel Model*

Addendum Document"); IEEE 802.11 *task group ad* (*TGad*) (*IEEE P802.11ad/D1.0 Draft Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment 5: Enhancements for Very High Throughput in the* 60 *GHz Band*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Figure 1:
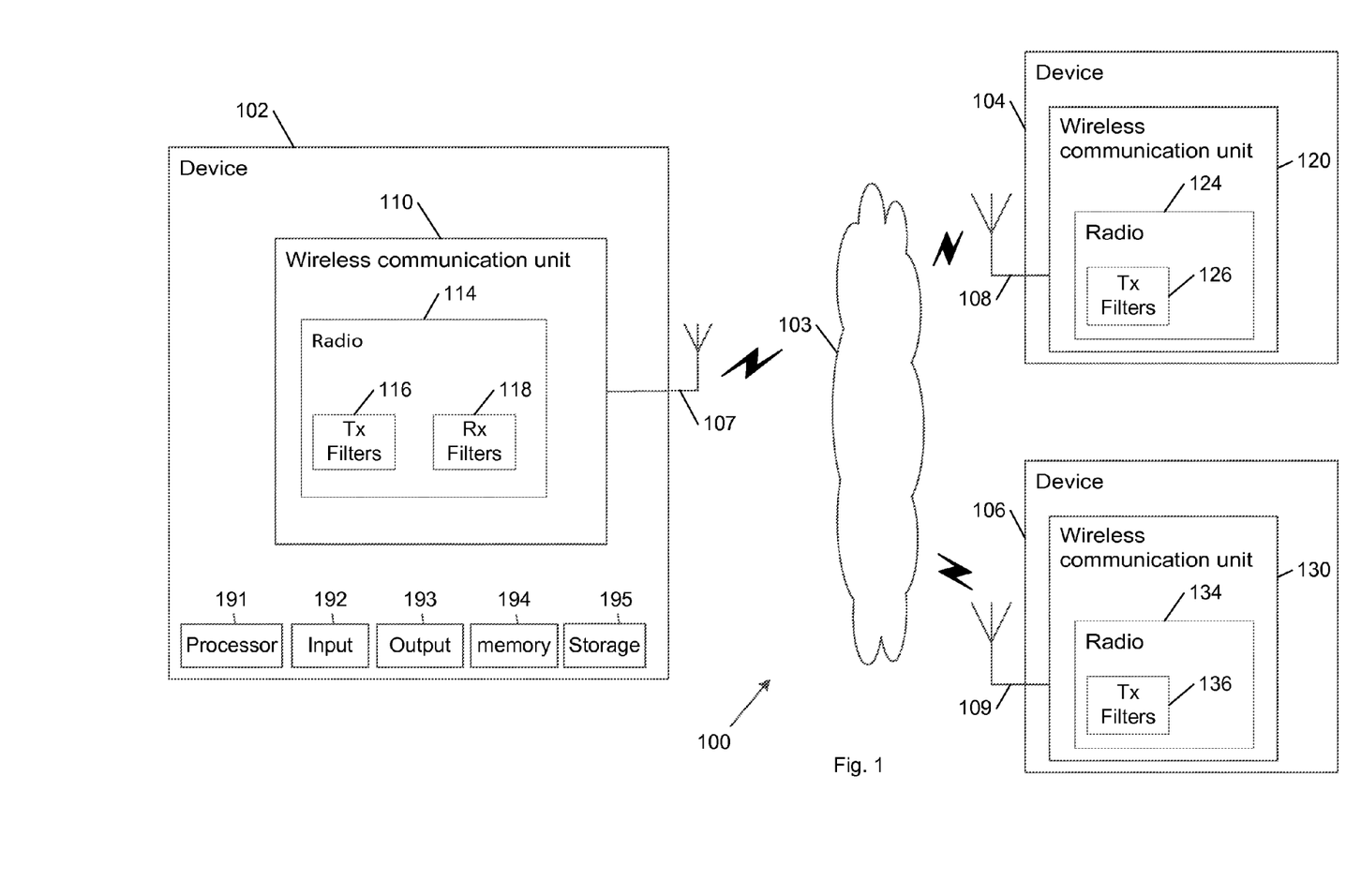
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102, 104 and/or 106, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 104 and/or 106 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102, 104 and/or 106 may include wireless communication units 110, 120 and/or 130, respectively, to perform wireless communication between wireless communication devices 102, 104 and/or 106 with one or more other wireless communication devices, e.g., as described below.

Wireless communication devices 102, 104 and/or 106 may also include, for example, one or more of a processor 191, an input unit 192, an output unit 193, a memory unit 194, and a storage unit 195. Wireless communication devices 102, 104 and/or 106 may optionally include other suitable hardware components and/or software components. In some demonstrative embodiments, some or all of the components of one or more of wireless communication devices 102, 104 and/or 106 may be enclosed in a common housing or packaging, and may be interconnected or operably associated using one or more wired or wireless links. In other embodiments, components of one or more of wireless communication devices 102, 104 and/or 106 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102, 104 and/or 106 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102, 104 and/or 106.

In some demonstrative embodiments, wireless communication units 110, 120 and 130 may include, or may be associated with, one or more antennas 107, 108 and 109, respectively. Antennas 107 and 108 may include any type of antennas suitable for transmitting and/or receiving wireless communication signals, blocks, frames, transmission streams, packets, messages and/or data. For example, antennas 107, 108 and 109 may include any suitable configuration, structure and/or arrangement of one or more antenna elements, components, units, assemblies and/or arrays. Antennas 107, 108 and 109 may include, for example, antennas suitable for directional communication, e.g., using beamforming techniques. For example, antennas 107 and 108 may include a phased array antenna, a single element antenna, a set of switched beam antennas, and/or the like. In some embodiments, antennas 107 and 108 may implement transmit and receive functionalities using separate transmit and receive antenna elements. In some embodiments, antennas 107, 108 and 109 may implement transmit and receive functionalities using common and/or integrated transmit/receive elements.

In some demonstrative embodiments, wireless communication units 110, 120 and/or 130 include, for example, one or more radios, e.g., a radio 114, a radio 124 and/or a radio 134. For example, radios 114, 124 and/or 134 may include one or more wireless transmitters, receivers and/or transceivers able to send and/or receive wireless communication signals, RF signals, frames, blocks, transmission streams, packets, messages, data items, and/or data. For example, wireless communication units 110, 120 and/or 130 may include or may be implemented as part of a wireless Network Interface Card (NIC), and the like.

In some demonstrative embodiments, radio 114 may include one or more transmitter (TX) filters 116, and/or one or more receiver (RX) filters 118; radio 124 may include one or more TX filters 126; and/or radio 134 may include one or more TX filters 136.

In some demonstrative embodiments, Tx filters 116, Tx filters 126, and/or Tx filters 136 may be configured to ensure that out-of-band energy, which is transmitted by a device, e.g., devices 102, 104 and/or 106, is below a predefined threshold.

In some demonstrative embodiments, system 100 may include two or more stations (STAs). For example, system 100 may include a first station, e.g., device 102, a second station, e.g., device 104, and/or a third STA, e.g., device 106.

In some demonstrative embodiments, system 100 may include one or more client STAs, and one or more APs. For example, device 102 may perform the functionality of a client STA and devices 104 and 106 may perform the functionality of an AP, e.g., a WiFi AP, a router, and the like.

In some demonstrative embodiments, device 102 may include, or may be included as part of a mobile or portable device, for example, a mobile computer, a laptop computer, a notebook computer, a tablet computer, a Smartphone, a handheld computer, a handheld device, a PDA device, a handheld PDA device, an on-board device, an off-board device, a hybrid device, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, an UMD, an UMPC, an MID, an "Origami"

device or computing device, a device that supports DCC, a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a music player, or the like.

In some demonstrative embodiments, devices 104 and 106 may include a non-mobile device, e.g., an AP, a static router, and the like.

In some demonstrative embodiments, device 102 may utilize a Time of Flight (ToF) measurement, e.g., to determine an estimated position of device 102, for example, when device 102 is located in an indoor location.

The ToF may be defined as the overall time a signal propagates from a first station, e.g., device 102, to a second station, e.g., device 104, and back to the first station. A distance between the first and second stations may be determined based on the ToF value, for example, by dividing the ToF value by two and multiplying the result by the speed of light, e.g., as described below with reference to FIG. 2.

Device 102 may determine a relative location of device 102 with respect to device 104, e.g., the distance between device 102 and device 104, based on the ToF measurement. Device 102 may determine an estimated location of device 102, by calculating additional distances, e.g., two or more distances, between device 102 and two or more other stations, e.g., device 106 and/or other APs, e.g., as described below with reference to FIG. 3.

In some demonstrative embodiments, the ToF measurement may be performed according to a ToF protocol, e.g., as described below.

Figure 2:
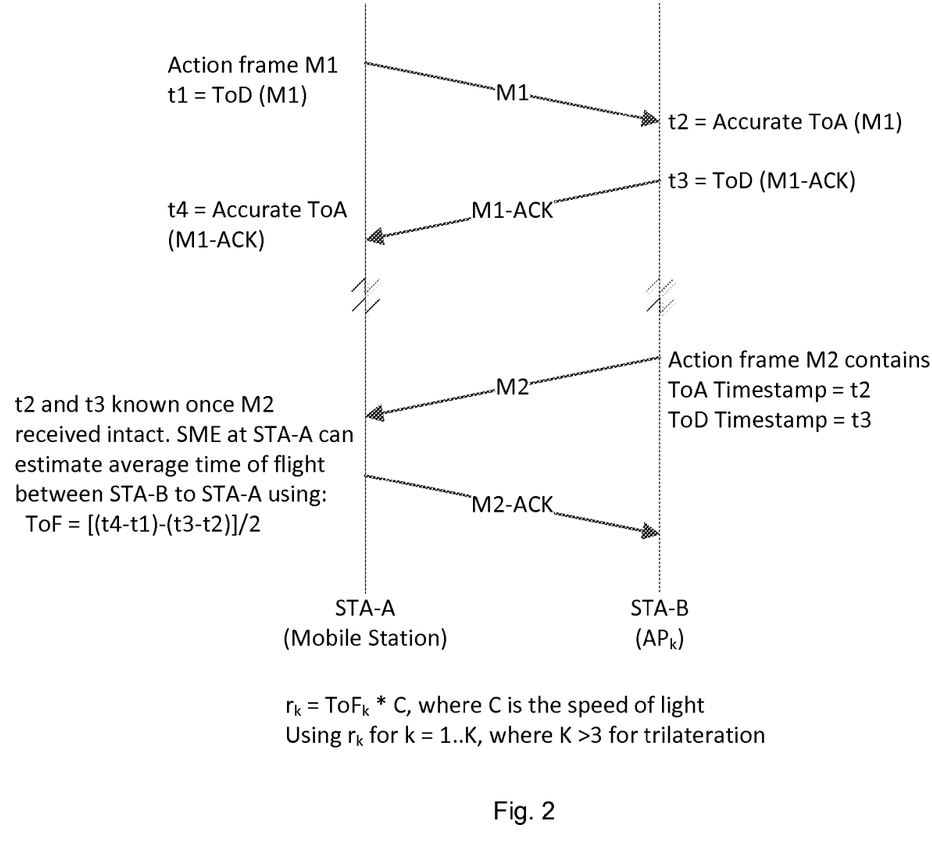
FIG. 2 is a schematic illustration of a sequence diagram, which demonstrates operations and interactions of a Time of Flight (ToF) measurement between a first device and a second device, in accordance with some demonstrative embodiments.

Reference is made to FIG. 2, which schematically illustrates a sequence diagram, which demonstrates operations and interactions of a ToF measurement between a first device (STA A) and a second device (STA B) according a ToF protocol, in accordance with some demonstrative embodiments. In one example, the first device may include a mobile client station, e.g., device 102 (FIG. 1), and the second device may include an AP, e.g., device 104 (FIG. 1) or device 106 (FIG. 1).

In some demonstrative embodiments, one or more of the operations of the sequence of FIG. 2 may be performed by the first and second devices, for example, in order to determine at least one location-related parameter, e.g., a relative location ("range") of the first device with respect to the second device.

In some demonstrative embodiments, the first device may transmit a message, denoted M1, to the second device, at a time, denoted t1, e.g., in an unassociated manner. The time t1 may be a Time of Departure (ToD), denoted ToD(M1), of the message M1.

In some demonstrative embodiments, the second device may receive the message M1 and determine a time, denoted t2, e.g., by determining a Time of Arrival (ToA), denoted ToA(M1), of the message M1.

In some demonstrative embodiments, the second device may transmit a message, denoted M1-ACK, to the first device, at a time, denoted t3. The message M1-ACK may include, for example, an acknowledgement message transmitted in response to the message M1. The time t3 may be a ToD, denoted ToD(M1-ACK), of the message M1-ACK.

In some demonstrative embodiments, the first device may receive the message M1-ACK and determine a time, denoted t4, e.g., by determining a ToA, denoted ToA(M1-ACK), of the message M1-ACK.

In some demonstrative embodiments, the second device may transmit a message, denoted M2, to the first device. Message M2 may include, for example, information corresponding to the time t2 and/or the time t3. For example, message M2 may include a timestamp, e.g., a ToA timestamp, including the time t2, and a timestamp, e.g., a ToD timestamp, including the time t3.

In some demonstrative embodiments, the first device may receive message M2. The first device may determine a ToF between the first and second devices, for example, based on message M2.

For example, the first device may determine an average ToF based on a calculation to applied to the time values t1, t2, t3 and t4. For example, the first device may determine the ToF, e.g., as follows:

$$ToF=[(t4-t1)-(t3-t2)]2 \quad (1)$$

In some demonstrative embodiments, the first device may transmit a message, denoted M2-ACK, to the second device. Message M2-ACK may include, for example, an acknowledgement message transmitted in response to message M2.

In some demonstrative embodiments, the first device may determine the range between the first and second devices based on the determined ToF.

For example, the first device may determine the range, denoted $r_k$, e.g., as follows:

$$r_k=ToF*C \quad (2)$$

wherein C denotes the radio wave propagation speed, e.g., the speed of light.

In some demonstrative embodiments, the first device may determine a location of the first device, e.g., an absolute location of the first device, based on the estimated range $r_k$, e.g., as described below.

For example, the first device may determine two or more ToF values and/or range values, e.g., according to Equations 1 and/or 2, with respect to two or more respective other devices, e.g., at least three or four other device, and may determine the location of the first device based on the two or more ToF values, for example, by trilateration, e.g., as describe below with reference to FIG. 3.

Figure 3:
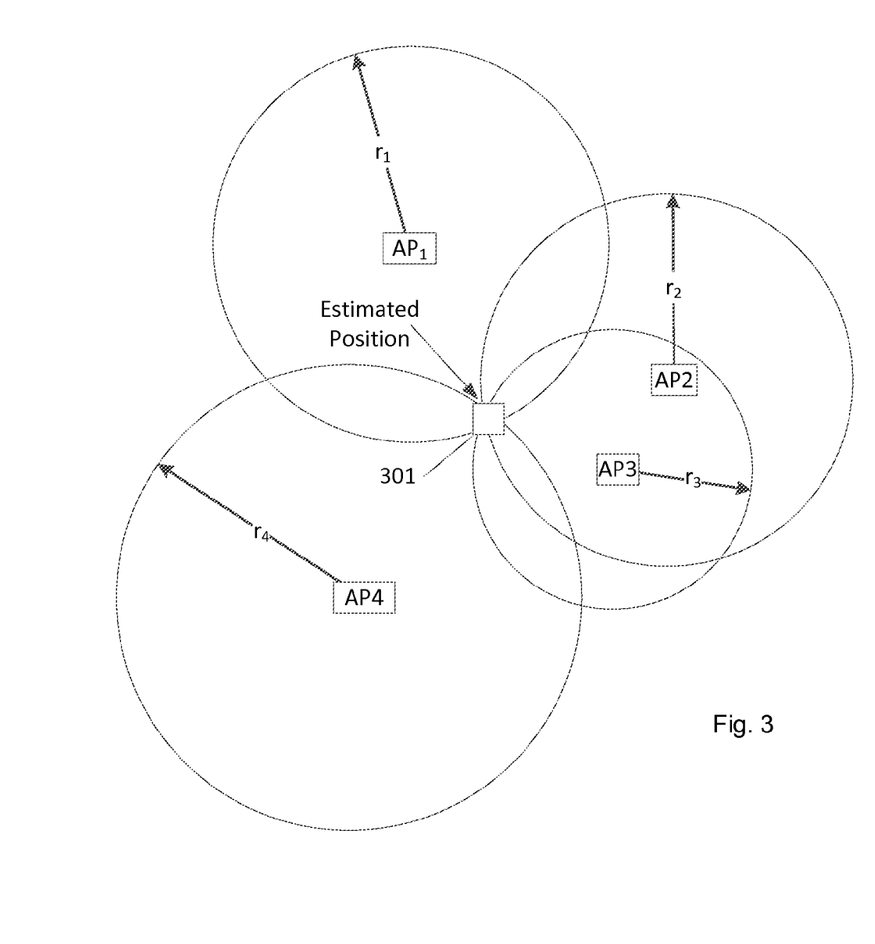
FIG. 3 is a schematic illustration of an estimated position calculation of a device, in accordance with some demonstrative embodiments.

Reference is now made to FIG. 3, which schematically illustrates an estimated position calculation of a device 301, in accordance with some demonstrative embodiments. In some demonstrative embodiments, device 301 may perform the functionality of the first device (STA A in FIG. 2).

In some demonstrative embodiments, device 301 may calculate the ToF between device 301 and two or more other devices, e.g., four devices, denoted $AP_1$, $AP_2$, $AP_3$ and $AP_4$. For example, devices $AP_1$, $AP_2$, $AP_3$ and/or $AP_4$ may perform the functionality of the second device (STA B in FIG. 2).

As shown in FIG. 3, device 301 may determine ranges, denoted $r_1$, $r_2$, $r_3$ and $r_4$, to devices $AP_1$, $AP_2$, $AP_3$ and $AP_4$, respectively, e.g., by calculating the ToF to each one of the devices $AP_1$, $AP_2$, $AP_3$ and $AP_4$, as described above.

As shown in FIG. 3, device 301 may calculate an estimated location of device 301 by utilizing any suitable method using the determined ranges $r_1$, $r_2$, $r_3$ and $r_4$. For example, device 301 may calculate the estimated location using trilateration.

Referring back to FIG. 1, in some demonstrative embodiments Tx filters 116, Tx filters 126 and/or Tx filters 136 may introduce a delay into signals transmitted by devices 102, 104 and/or 106, respectively. A delay may also be introduced by one or more Rx filters. For example, Rx filters 118 may introduce a delay into signals received by device 102. The Tx and/or Rx delay may include a frequency dependent delay.

For example, time t2 (FIG. 2) may include a delay introduced by Tx filters 116, e.g. when device 102 transmits message M1 (FIG. 2), and time t4 may include a delay introduced by Tx filters 126 and/or Rx filters 118, e.g. when device 104 transmits message M1-ACK (FIG. 2).

The ToF, which may be based on the transmitted signals, may include the delays and, as a result, a location calculated based on the ToF may have reduced accuracy. For example, a delay of more than 10 nanoseconds (ns) may account for a deviation of at least 3 meters from an actual location.

It may be impossible to account for this delay at a station ("the receiver station") receiving a signal, e.g., without prior knowledge of filter parameters of the station transmitting the signal ("the transmitter station").

In some demonstrative embodiments, the filter coefficients of the transmitter station may be known at the transmitter station. For example, filter coefficients of Tx filters 126 may be known by device 104.

In some demonstrative embodiments, the transmitter station may communicate the filter coefficients of the transmitter station to the receiver station, e.g., as described below.

In some demonstrative embodiments, filter coefficients, e.g., Tx-filter coefficients and/or Rx-filter coefficients, may be exchanged between devices 102 and 104, e.g., as described below.

In some demonstrative embodiments, device 102 may use the filter coefficients of Tx filters 126, for example, to account for a filter delay introduced into transmissions by device 104, e.g., to improve an accuracy of a ToF-based calculation; and/or device 104 may use the filter coefficients of Tx filters 116, for example, to account for a filter delay introduced into transmissions of device 102, e.g., to improve an accuracy of a ToF-based calculation. For example, device 102 may receive the filter coefficient of device 104, may calculate a delay of TX filters 126 and may reduce the delay from the calculated ToF, to improve the accuracy of the range calculated between devices 102 and 104.

In some demonstrative embodiments, devices 102, 104 and/or 106 may communicate with one another filter information including Tx filter information. The Tx filter information may represent one or more Tx filter parameters of one or more Tx filters utilized by devices 102, 104 and/or 106, e.g., Tx filters 116, 126 and/or 136.

In one example, device 102 may transmit to device 104 Tx filter information representing one or more Tx filter parameters of Tx filters 116, and device 104 may receive the Tx filter information representing the one or more Tx filter parameters of Tx filters 116, e.g., as described below.

Additionally or alternatively, device 104 may transmit to device 102 Tx filter information representing one or more Tx filter parameters of Tx filters 126, and device 102 may receive the Tx filter information representing the one or more Tx filter parameters of Tx filters 126.

Additionally or alternatively, device 106 may transmit to device 104 Tx filter information representing one or more Tx filter parameters of Tx filters 136, and device 104 may receive the Tx filter information representing the one or more Tx filter parameters of Tx filters 136.

Additionally or alternatively, devices 102 and 104 may communicate with one another filter information representing Tx and/or Rx parameters of one or more other devices. For example, device 102 may be configured to receive from device 104 Tx filter information representing one or more Tx filter parameters of Tx filters 136 of device 106.

In some demonstrative embodiments, the Tx filter information corresponding to a Tx filter parameter may represent a plurality of values of the Tx filter parameter. For example, the Tx filter information may represent a plurality of values of an amplitude and/or a phase of a Tx filter with respect to a plurality of different frequencies.

In some demonstrative embodiments, the plurality of values may be represented, for example, by at least one function, which may be determined by utilizing any approximation method, e.g., regression method, curve fitting and the like.

In some demonstrative embodiments, the Tx filter information communicated between devices 102, 104 and 106 may include a plurality of coefficients representing the at least one function of at least one Tx parameter of the Tx parameters.

In some demonstrative embodiments, the plurality of coefficients may include a plurality of polynomial coefficients of a curve fitted to the function, a plurality of polynomial coefficients of an error curve fitted to an error function corresponding to the Tx parameter, and/or any other coefficients representing any other function corresponding to the Tx parameters.

In one example, a curve representing the phase function of a Tx filter, e.g., a function representing the phase versus frequency, may be represented by a polynomial function, e.g., according to any estimation method. According to this example, the Tx filter information may be communicated in the form of polynomial coefficients of the polynomial function.

In another example, an error function may be defined with respect to the Tx parameters. For example, the error function corresponding to Tx filters 116 may define, for example, the difference between a phase of Tx filters 116, as assumed by device 104, and the actual phase of Tx filters 116. The error function may be represented by a polynomial function. According to this example, the Tx information may be communicated in the form of polynomial coefficients of the polynomial function.

In a further example, the phase function of the Tx filter may be represented by a Taylor series, and the Tx information may be communicated in the form of the coefficients of the Taylor series.

In some demonstrative embodiments, the Tx filter information may include one or more predefined code-words representing the Tx parameter.

For example, a plurality of code words may be predefined with respect to a plurality of predefined phase curves, e.g., each codeword representing a different predefined phase curve. According to this example, a first station may select from the plurality of predefined phase curves a phase curve, which has a best fit to the actual phase curve of a Tx filter of the first station, and the first station may transmit the Tx information including the code word corresponding to the selected predefined phase curve. A second station may receive the code word, and may determine the phase curve of the Tx filter based on the code word.

In some demonstrative embodiments, the Tx information may include information representing the amplitude function of the Tx filter, e.g., in a similar manner to the phase function of the Tx filter.

In some demonstrative embodiments, devices 102, 104 and/or 106 may communicate the filter information as part of a ToF frame communicated between devices 102 and 104. For example, devices 102 and/or 104 may communicate the filter information as part of the one or more of messages of the ToF protocol described above with reference to FIG. 2.

In some demonstrative embodiments, the ToF frame may include, for example, a ToF request frame transmitted from device 102 to device 104, e.g., the message M1 (FIG. 2), and the Tx filter information may represent one or more Tx filter parameters of Tx filters 116.

In some demonstrative embodiments, the ToF frame may include, for example, a ToF response frame transmitted from device 104 to device 102, e.g., the message M2 (FIG. 2), and the Tx filter information may represent one or more Tx filter parameters of Tx filters 126.

In some demonstrative embodiments, a dedicated field may be added to the ToF frames, e.g., to the ToF request message and/or the ToF response message.

In some demonstrative embodiments, a dedicated field may be added to the ToF request message, e.g., message M1 described above with reference to FIG. 2, which may be sent from device 102 to device 104.

In some demonstrative embodiments, the dedicated field may indicate one or more Tx-filter coefficients of Tx filters 116.

In some demonstrative embodiments, the one or more Tx filter parameters may include, for example, the amplitude and/or phase of Tx filters 116.

In some demonstrative embodiments, a dedicated field may be added to the ToF response message, e.g., message M2 described above with reference to FIG. 2, which may be sent from device 104 to device 102.

In some demonstrative embodiments, the dedicated field may indicate one or more Tx-filter coefficients of Tx filters 126.

In some demonstrative embodiments, the one or more Tx filter parameters may include, for example, the amplitude and/or phase of Tx filters 126.

In some demonstrative embodiments, device 102 and/or device 104 may communicate the filter information as part of dedicated filter information frames, which may be communicated in addition to the frames of the ToF protocol.

In some demonstrative embodiments, device 102 and/or device 104 may communicate the filter information as part of a dedicated filter information response frame, which is communicated in response to a dedicated filter information request frame.

In some demonstrative embodiments, the filter information request frame may be transmitted from device 102 to device 104.

In some demonstrative embodiments, the filter information response frame may be transmitted from device 104, and the Tx filter information may represent one or more Tx filter parameters of TX filters 126.

In some demonstrative embodiments, device 104 may transmit the filter information including Tx filter information representing one or more Tx filter parameters of Tx filters utilized by one or more other APs, e.g., device 106 and/or one or more other APs in communication with device 104. For example, device 104 may receive from device 106 Tx filter information representing one or more Tx filter parameters of Tx filters 136, e.g., in response to a filter information request frame transmitted from device 104 to device 106. Device 104 may transmit to device 102 the Tx filter parameters of Tx filters 136 of device 106, for example, as part of a filter information response frame transmitted in response to a filter information request frame received from device 102.

In some demonstrative embodiments, device 102 may utilize the Tx filter information of the one or more other APs, e.g., when performing ToF measurements with the other APs, for example, as part of a trilateration procedure, e.g., as described above with reference to FIG. 3.

For example, device 102 may transmit a filter information request frame to device 104. Device 104 may receive the filter information request frame and may transmit, in response to the filter information request frame, a filter information response frame to device 102. The filter information response frame may include Tx filter parameters of Tx filters 136 and/or Tx filters parameters of Tx filters 126. Device 102 may calculate a delay of Tx filters 136 and may utilize the calculated delay when performing ToF measurement with device 106.

In some demonstrative embodiments, a set of dedicated un-associated/associated messages may be defined for communicating the Tx-filter coefficients. The messages may be integrated, for example, within the ToF protocol.

In some demonstrative embodiments, a Tx-filter coefficients Request may be transmitted by device 102 before or after a ToF request, e.g., before or after message M1 (FIG. 2). The Tx-filter coefficients Request may optionally include, for example, the Tx-filter coefficients of Tx filters 116.

In some demonstrative embodiments, device 104 may transmit to device 102 a Tx-filter coefficients response, in response to the Tx-filter coefficients Request. The Tx coefficient response may include the Tx-filter coefficients of Tx filters 126. For example, the Tx-filter coefficients response may be communicated before or after message M2 (FIG. 2).

In some demonstrative embodiments, the Tx-filter coefficients response may optionally include Tx-filter coefficients of one or more, e.g., all, APs in a neighbor list of device 104. For example, the Tx-filter coefficients response may include Tx-filter coefficients of Tx filters 136. Accordingly, when an AP receives a Tx-filter coefficient request it may respond with a response including, for example, the Tx-filter coefficients of the AP and, optionally, the Tx-filter coefficients of one or more, e.g., all, neighboring AP's.

In one example, device 102 may receive the filter coefficients of the one or more APs, e.g., device 106, in the neighbor list of device 104 and may utilize the filter coefficients of device 106 when measuring a ToF with device 106.

In some demonstrative embodiments, the Tx filter information may be communicated as part of a beacon frame. For example, device 104 may periodically transmit a beacon frame as part of a searching procedure and/or a network establishing procedure with other devices.

In one example, device 104 may transmit a beacon including the Tx-filter coefficients of TX filters 126. The beacon may optionally include the Tx-filter coefficients of one or more other APs, e.g., Tx filter information of device 106, as described above.

In some demonstrative embodiments, device 102, may receive the beacon, and may derive the Tx-filter coefficients of TX filters 126 from the beacon.

In some demonstrative embodiments, device 102 may transmit the Tx-filter coefficients of Tx filters 116 to device 104, if desired, for example, as part of the ToF request, e.g., as described above.

In some demonstrative embodiments, device 102 may utilize the Tx-filter information of device 104 to account for a delay introduced by Tx filters 126, e.g., when calculating the ToF between devices 102 and 104; and/or device 104 may utilize the Tx-filter information of device 102 to account for a delay introduced by Tx filters 116, e.g., when calculating the ToF between devices 102 and 106.

As a result, ToF performance and/or robustness of devices 102, 104 and/or 106 may significantly increase.

In some demonstrative embodiments, an increase in the accuracy of the calculated ToF may result in an increase in the accuracy of a calculated location of device 102. For example, the accuracy of ranges $r_1$, $r_2$, $r_3$ and $r_4$ (FIG. 3) may increase and, accordingly, the estimated location of device 301 (FIG. 3) may be more accurate.

Some demonstrative embodiments are described above with reference to communicating filter information including Tx filter information. However, other embodiments may be implemented for communicating Rx filter information, e.g., in the form of Rx filter coefficients, and/or any other filter information. For example, device 102 may communicate to device 104 Rx filter information representing one or more Rx filter parameter of Rx filters 118, e.g., in addition to, or instead of, the Tx information.

Figure 4:
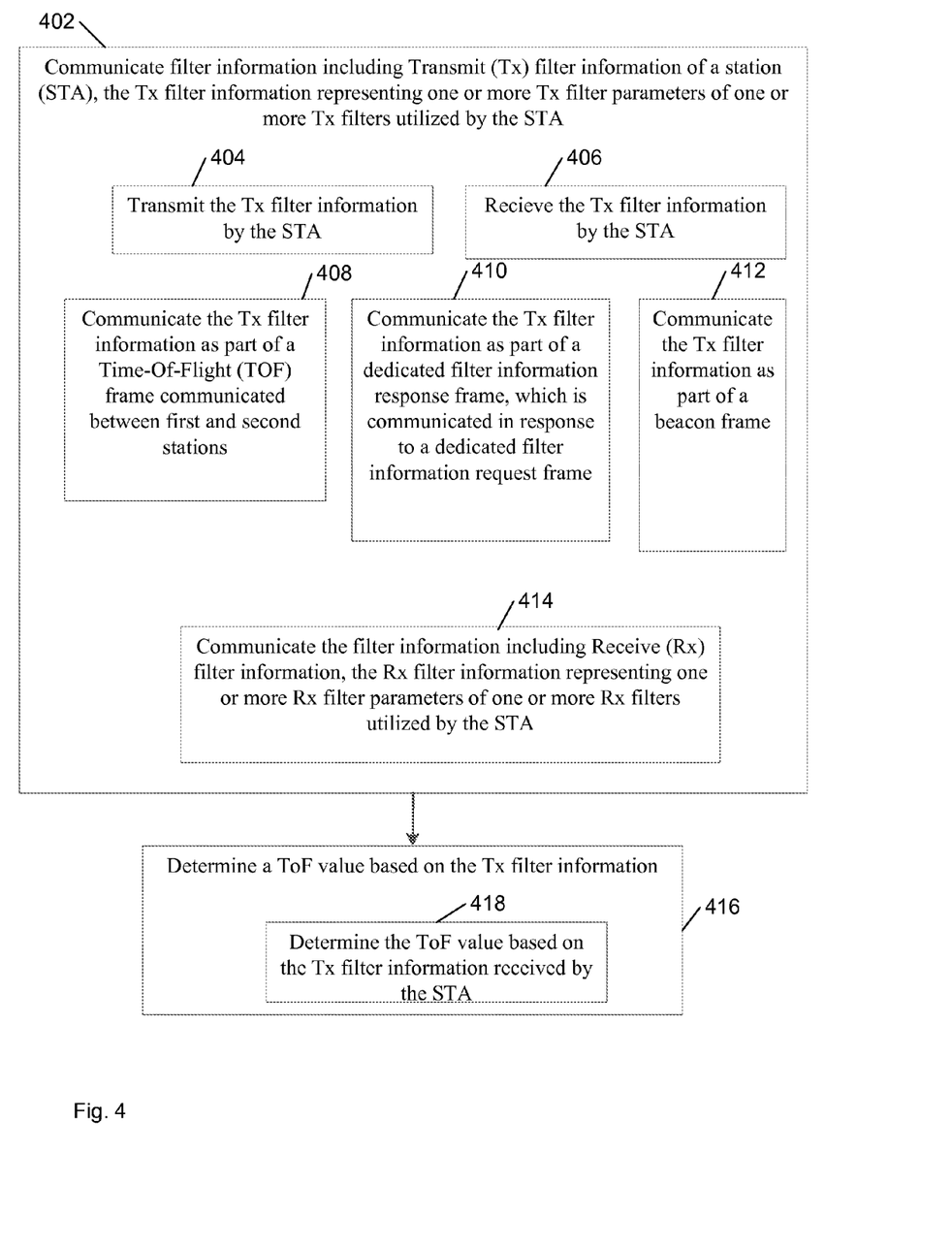
FIG. 4 is a schematic flow-chart illustration of a method of communicating filter information, in accordance with some demonstrative embodiments.

Reference is made to FIG. 4, which schematically illustrates a method of communicating filter information, in accordance with some demonstrative embodiments. In some embodiments, one or more of the operations of the method of FIG. 4 may be performed by a wireless communication system e.g., system 100 (FIG. 1); a wireless communication device, e.g., devices 102, 104 and/or 106 (FIG. 1); and/or a wireless communication unit, e.g., wireless communication units 110, 120 and/or 130 (FIG. 1).

As indicated at block 402, the method may include communicating filter information including Tx filter information of a STA, the Tx filter information representing one or more Tx filter parameters of one or more Tx filters utilized by the STA. For example, device 104 (FIG. 1) may communicate filter information including Tx filter information of device 104, the Tx filter information representing one or more Tx filter parameters of Tx filters 126 (FIG. 1), e.g., as described above.

As indicated at block 404, communicating the filter information may include transmitting the Tx filter information by the STA. For example, device 104 (FIG. 1) may transmit the Tx filter information representing one or more Tx filter parameter of Tx filters 126 (FIG. 1), e.g., as described above.

As indicated at block 406, communicating the filter information may include receiving the Tx filter information from the STA. For example, device 102 (FIG. 1) may receive the Tx filter information representing one or more Tx filter parameters of Tx filters 126 (FIG. 1), e.g., as described above.

As indicated at block 408, communicating the filter information may include communicating the filter information as part of a ToF frame communicated between first and second stations. For example, device 102 (FIG. 1) may communicate the filter information as part of message M1 (FIG. 2) communicated between devices 102 and 104; and/or device 104 (FIG. 1) may communicate the filter information as part of message M2 (FIG. 2) communicated between devices 102 and 104, e.g., as described above.

As indicated at block 410, communicating the filter information may include communicating the filter information as part of a dedicated filter information response frame, which is communicated in response to a dedicated filter information request frame. For example, device 104 (FIG. 1) may receive the dedicated filter information request from device 102 (FIG. 1), and device 104 (FIG. 1) may transmit the filter information in the dedicated filter information response frame, e.g., as described above.

As indicated at block 412, communicating the filter information may include communicating the filter information as part of a beacon frame. For example, device 104 (FIG. 1) may communicate the filter information as part of the beacon frame, e.g., as described above.

As indicated at block 414, communicating the filter information may include communicating Rx filter information, the Rx filter information representing one or more Rx filter parameters of one or more Rx filters utilized by the STA. For example, device 102 (FIG. 1) may transmit the filter information including filter information representing one or more Rx filter parameters of Rx filters 118 (FIG. 1), e.g., as described above.

As indicated at block 418, the method may include determining the ToF value based on the Tx filter information received by the STA. For example, device 102 (FIG. 1) may determine the ToF between devices 102 (FIG. 1) and 104 (FIG. 1) based on the Tx filter information received from device 104 (FIG. 1), e.g., as described above.

Figure 5:
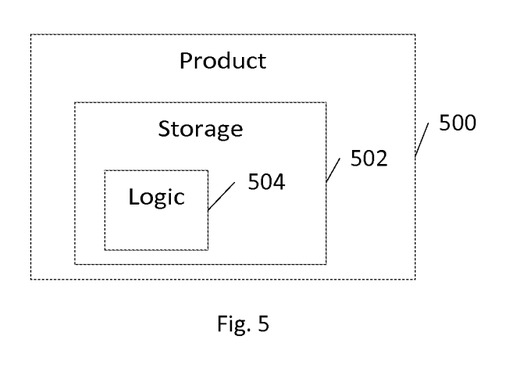
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), device 104 (FIG. 1), device 106 (FIG. 1), wireless communication unit 110 (FIG. 1), wireless communication unit 120 (FIG. 1), wireless communication unit 130 and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a wireless communication unit to perform the functionality of a first station (STA) to communicate with a second STA, said wireless communication unit is to communicate a Time of Flight (ToF) request frame between the first STA and the second STA in an unassociated manner, the ToF request frame comprises a ToF request of a ToF measurement between the first STA and the second STA, the ToF request frame is prior to communication of a message including timestamps of the ToF measurement between the first STA and the second STA, the ToF request frame comprising filter information including Transmit (Tx) filter information, said Tx filter information representing one or more Tx filter parameters of one or more Tx filters utilized by at least one STA selected from the group consisting of said first STA and said second STA, said Tx filter parameters represent a frequency-based time delay to be introduced by said one or more Tx filters to one or more transmissions from said STA during the ToF measurement between the first STA and the second STA.

2. The apparatus of claim 1, wherein said wireless communication unit is to transmit said filter information to said second STA, wherein said Tx filter information represents one or more Tx filter parameters of one or more Tx filters utilized by said first STA.

3. The apparatus of claim 1, wherein said wireless communication unit is to receive said filter information from said second STA, wherein said Tx filter information represents one or more Tx filter parameters of one or more Tx filters utilized by said second STA, and wherein said wireless communication unit is to calculate a Time-of-Flight (ToF) between said wireless communication unit and said second STA based on said Tx filter information.

4. The apparatus of claim 1, wherein said ToF request frame is transmitted from said first STA to said second STA, and wherein said Tx filter information represents one or more Tx filter parameters of one or more Tx filters utilized by said first STA.

5. The apparatus of claim 1, wherein said ToF request frame is transmitted from said second STA to said first STA, and wherein said Tx filter information represents one or more Tx filter parameters of one or more Tx filters utilized by said second STA.

6. The apparatus of claim 1, wherein said wireless communication unit is to communicate said filter information as part of a dedicated filter information response frame, which is communicated in response to a dedicated filter information request frame.

7. The apparatus of claim 1, wherein said Tx filter information represents one or more Tx filter parameters of one or more Tx filters utilized by at least a third station.

8. The apparatus of claim 1, wherein said wireless communication unit is to communicate said filter information as part of a beacon frame.

9. The apparatus of claim 1, wherein said one or more Tx filter parameters comprise at least one parameter selected from the group consisting of amplitude and phase.

10. The apparatus of claim 1, wherein said Tx filter information represents at least one function of at least one Tx parameter of said Tx parameters.

11. The apparatus of claim 10, wherein said Tx filter information represents at least one type of information selected from the group consisting of a plurality of coefficients representing said at least one function and one or more predefined code-words representing said at least one function.

12. The apparatus of claim 1, wherein said filter information includes Receive (Rx) filter information, said Rx filter information representing one or more Rx filter parameters of one or more Rx filters utilized by at least one STA selected from the group consisting of said first STA and said second STA.

13. A system comprising:
    at least one wireless communication device including:
    one or more antennas; and
    a wireless communication unit to perform the functionality of a first station (STA) to communicate with a second STA, said wireless communication unit is to communicate a Time of Flight (ToF) request frame between the first STA and the second STA in an unassociated manner, the ToF request frame comprises a ToF request of a ToF measurement between the first STA and the second STA, the ToF request frame is prior to communication of a message including timestamps of the ToF measurement between the first STA and the second STA, the ToF request frame comprising filter information including Transmit (Tx) filter information, said Tx filter information representing one or more Tx filter parameters of one or more Tx filters utilized by at least one STA selected from the group consisting of said first STA and said second STA, said Tx filter parameters represent a frequency-based time delay to be introduced by said one or more Tx filters to one or more transmissions from said STA during the ToF measurement between the first STA and the second STA.

14. The system of claim 13, wherein said wireless communication unit is to transmit said filter information to said second STA, wherein said Tx filter information represents one or more Tx filter parameters of one or more Tx filters utilized by said first STA.

15. The system of claim 13, wherein said wireless communication unit is to receive said filter information from said second STA, wherein said Tx filter information represents one or more Tx filter parameters of one or more Tx filters utilized by said second STA, and wherein said wireless communication unit is to calculate a Time-of-Flight (ToF)

between said wireless communication unit and said second STA based on said Tx filter information.

16. The system of claim 13, wherein said one or more Tx filter parameters comprise at least one parameter selected from the group consisting of amplitude and phase.

17. The system of claim 13, wherein said wireless communication unit is to communicate said filter information as part of a dedicated filter information response frame, which is communicated in response to a dedicated filter information request frame.

18. The system of claim 13, wherein said Tx filter information represents one or more Tx filter parameters of one or more Tx filters utilized by at least a third station.

19. A method to be performed at a first station (STA), the method comprising:
communicating a Time of Flight (ToF) request frame between the first STA and a second STA in an unassociated manner, the ToF request frame comprises a ToF request of a ToF measurement between the first STA and the second STA, the ToF request frame is prior to communication of a message ins hiding timestamps of the ToF measurement between the first STA and the second STA, the ToF request frame comprising filter information including Transmit (Tx) filter information of at least one STA of said first STA or said second STA, said Tx filter information representing one or more Tx filter parameters of one or more Tx filters utilized by said STA, said Tx filter parameters represent a frequency-based time delay to be introduced by said one or more Tx filters to one or more transmissions from said STA during the ToF measurement between the first STA and the second STA.

20. The method of claim 19 comprising transmitting said Tx filter information by said first station.

21. The method of claim 19 comprising receiving said Tx filter information from said second station.

22. The method of claim 21 comprising determining a ToF between the first and second stations based on said filter information.

23. The method of claim 19, wherein said one or more Tx filter parameters comprise at least one parameter selected from the group consisting of amplitude and phase.

24. The method of claim 19 comprising communicating said filter information as part of a beacon frame.

25. A product including a non-transitory storage medium having stored thereon instructions that, when executed by a machine at a first station (STA), result in:
communicating a Time of Flight (ToF) request frame between the first STA and a second STA in an unassociated manner, the ToF request frame comprises a ToF request of a ToF measurement between the first STA and the second STA, the ToF request frame is prior to communication of a message including timestamps of the ToF measurement between the first STA and the second STA, the ToF request frame comprising filter information including Transmit (Tx) filter information of at least one STA of said first STA or said second STA, said Tx filter information representing one or more Tx filter parameters of one or more Tx filters utilized by said STA, said Tx filter parameters represent a frequency-based time delay to be introduced by said one or more Tx filters to one or more transmissions from said STA during the ToF measurement between the first STA and the second STA.

26. The product of claim 25, wherein said Tx filter information represents at least one function of at least one Tx parameter of said Tx parameters.

27. The product of claim 25, wherein said instructions result in communicating said filter information as part of a dedicated filter information response frame, which is communicated in response to a dedicated filter information request frame.

28. The product of claim 25, wherein said instructions result in communicating said filter information as part of a beacon frame.

29. The product of claim 25, wherein said one or more Tx filter parameters comprise at least one parameter selected from the group consisting of amplitude and phase.

* * * * *

UNITED STATES PATENT AND TRADEMARK OFFICE
CERTIFICATE OF CORRECTION

PATENT NO. : 9,859,993 B2
APPLICATION NO. : 13/681561
DATED : January 2, 2018
INVENTOR(S) : Yuval Amizur et al.

Page 1 of 1

It is certified that error appears in the above-identified patent and that said Letters Patent is hereby corrected as shown below:

In the Claims

In Column 17, Line 21, in Claim 19, delete "ins hiding" and insert -- including --, therefor.

Signed and Sealed this
Nineteenth Day of June, 2018

Andrei Iancu
*Director of the United States Patent and Trademark Office*